(12) United States Patent
Sakurai et al.

(10) Patent No.: US 10,614,957 B2
(45) Date of Patent: Apr. 7, 2020

(54) DIELECTRIC CERAMIC COMPOSITION AND MULTILAYER CERAMIC CAPACITOR

(71) Applicant: TDK CORPORATION, Tokyo (JP)

(72) Inventors: Dan Sakurai, Tokyo (JP); Toshihiko Kaneko, Tokyo (JP); Nobuto Morigasaki, Tokyo (JP); Toshinari Takahashi, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/250,702

(22) Filed: Jan. 17, 2019

(65) Prior Publication Data
US 2019/0237255 A1 Aug. 1, 2019

(30) Foreign Application Priority Data
Jan. 31, 2018 (JP) ................. 2018-015887

(51) Int. Cl.
| | |
|---|---|
| *C04B 35/49* | (2006.01) |
| *H01G 4/12* | (2006.01) |
| *H01G 4/30* | (2006.01) |
| *H01G 4/008* | (2006.01) |
| *C04B 35/468* | (2006.01) |

(Continued)

(52) U.S. Cl.
CPC ....... *H01G 4/1245* (2013.01); *C04B 35/4682* (2013.01); *C04B 35/49* (2013.01); *C04B 35/62218* (2013.01); *C04B 35/638* (2013.01); *H01G 4/008* (2013.01); *H01G 4/30* (2013.01); *C04B 2235/3212* (2013.01); *C04B 2235/3213* (2013.01); *C04B 2235/3215* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01); *C04B 2235/6562* (2013.01); *C04B 2235/6565* (2013.01); *C04B 2235/6582* (2013.01); *C04B 2235/6584* (2013.01);
(Continued)

(58) Field of Classification Search
CPC .............................. C04B 35/49; H01G 4/1245
See application file for complete search history.

(56) References Cited

U.S. PATENT DOCUMENTS

| | | | |
|---|---|---|---|
| 9,966,190 B2 * | 5/2018 | Sakurai | C04B 35/49 |
| 10,074,480 B2 * | 9/2018 | Sakurai | C04B 35/49 |

(Continued)

FOREIGN PATENT DOCUMENTS

JP 2011-256091 A 12/2011

*Primary Examiner* — Karl E Group
(74) *Attorney, Agent, or Firm* — Oliff PLC

(57) ABSTRACT

A dielectric ceramic composition having good properties, particularly good IR property and high temperature accelerated lifetime, even under high electric field intensity. A dielectric ceramic composition having a main component made of a perovskite type compound expressed by a compositional formula of $(Ba_{1-x-y}Sr_xCa_y)_m(Ti_{1-z}Zr_z)O_3$ (note that, m, x, y, and z of the above compositional formula all represent molar ratios, and each satisfies $0.9<m<1.1$, $0<x<0.5$, $0<y<0.3$, $0<(x+y)<0.6$, and $0.03<z<0.3$), and a first sub component made of an oxide of a rare earth element R (note that, R is at least one selected from the group consisting of Sc, Y, La, Ce, Pr, Nd, Pm, Sm, Eu, Gd, Tb, Dy, Ho, Er, Tm, Yb, and Lu), wherein the dielectric ceramic composition includes dielectric particles and a particle boundary.

6 Claims, 5 Drawing Sheets

(51) Int. Cl.
*C04B 35/622* (2006.01)
*C04B 35/638* (2006.01)

(52) U.S. Cl.
CPC .. *C04B 2235/661* (2013.01); *C04B 2235/664* (2013.01); *C04B 2235/85* (2013.01)

(56) References Cited

U.S. PATENT DOCUMENTS

| | | | | |
|---|---|---|---|---|
| 2017/0287635 A1* | 10/2017 | Sakurai | .................. | C04B 35/49 |
| 2017/0287636 A1* | 10/2017 | Sakurai | .................. | C04B 35/49 |
| 2019/0237254 A1* | 8/2019 | Sakurai | ............. | C04B 35/62675 |

* cited by examiner

DIELECTRIC CERAMIC COMPOSITION AND MULTILAYER CERAMIC CAPACITOR

BACKGROUND OF THE INVENTION

The present invention relates to a dielectric ceramic composition and a multilayer ceramic capacitor including a dielectric layer having the dielectric ceramic composition. The present invention particularly relates to the dielectric ceramic composition having good IR property and highly accelerated lifetime.

Recently, as the electronic circuit has become highly densified, the electronic component is demanded to be more compact, and the multilayer ceramic capacitor has rapidly become more compact and has larger capacity, further the purpose of use has become wider, thus various properties are demanded.

For example, a mid-high voltage capacitor which is used at a high rated voltage (for example 100 V or higher) is suitably used for ECM (Engine Electric Computer Module), a fuel injection device, an electric controlled throttle, an inverter, a convertor, HID headlamp unit, a battery control unit for hybrid engine, a digital steel camera, and the like.

In case of using at a high rated voltage as mentioned in the above, it is used under a high electric field intensity, but when the electric field intensity increases, the specific permittivity and the insulation resistance decrease, hence as a result, an effective capacity or a reliability under the used environment may decrease.

For example, Patent document 1 discloses a multilayer ceramic capacitor having a dielectric layer made of a dielectric particle having a core-shell structure. This dielectric particle has a concentration gradient of a sub component at a shell part, and a maximum value of the sub component concentration is found near the particle boundary and near a boundary between the shell part and the core part. The multilayer ceramic capacitor using this dielectric particle has good capacity-temperature property and lifetime property.

However, the multilayer ceramic capacitor described in Patent document 1 exhibited insufficient properties under a high electric field intensity such as when applying DC voltage and the like thus further improvement of the properties were demanded.

Patent document 1: JP Patent Application Laid Open No. 2011-256091

SUMMARY OF THE INVENTION

The present invention is attained in view of such circumstances, and the object is to provide a dielectric ceramic composition having good properties, particularly good IR property and high temperature accelerated lifetime, even under high electric field intensity. Also, the object of the present invention is to provide a multilayer ceramic capacitor having a dielectric layer including the dielectric ceramic composition. In order to attain the above object, the dielectric ceramic composition includes a main component made of a perovskite type compound expressed by a compositional formula of $(Ba_{1-x-y}Sr_xCa_y)_m(Ti_{1-z}Zr_z)O_3$ (note that, m, x, y, and z of the above compositional formula all represent molar ratios, and each satisfies $0.9 \leq m \leq 1.1$, $0 \leq x \leq 0.5$, $0 \leq y \leq 0.3$, $0 \leq (x+y) \leq 0.6$, and $0.03 \leq z \leq 0.3$), and a first sub component made of an oxide of a rare earth element R (note that, R is at least one selected from the group consisting of Sc, Y, La, Ce, Pr, Nd, Pm, Sm, Eu, Gd, Tb, Dy, Ho, Er, Tm, Yb, and Lu), wherein the dielectric ceramic composition includes dielectric particles and a particle boundary, and the dielectric particles include a complete solid solution particle in which Zr and the rare earth element are solid dissolved to the entire dielectric particle, when Ra represents a concentration of the rare earth element R in the dielectric ceramic composition in case a concentration of Ti atom in the dielectric ceramic composition is deemed to be 100 atom %, and when Zb represents the average concentration of Zr and Rb represents an average concentration of the rare earth element in the complete solid solution particle in case the concentration of Ti atom in the complete solid solution particle is deemed to be 100 atom %, 0.82<(Rb/Ra), and 0.6<(Rb/Zb)<1.0 are satisfied.

In the present embodiment, (Rb/Zb) preferably satisfies 0.7<(Rb/Zb)<1.0.

As the electronic component according to the present invention, it is not particularly limited as long as it includes the above mentioned dielectric ceramic composition, and for example a multilayer ceramic capacitor, a piezoelectric element, a chip inductor, a chip varistor, a chip thermistor, a chip resistor, other surface mounting (SMD) chip type electronic component, and the like may be mentioned. The multilayer ceramic capacitor has the dielectric layer including the dielectric ceramic composition of the present invention, and the internal electrode layer.

According to the present invention, by setting the composition of the main component within a predetermined range, and by setting the diffusion condition of the rare earth element R and Zr within the above mentioned range, the dielectric ceramic composition having particularly good IR property and high temperature accelerated lifetime can be obtained. Particularly, by forming a complete solid solution particle in which the rare earth element R and Zr are uniformly dispersed, the basic properties such as a specific permittivity and the like can be maintained good, and also the IR property and the high temperature accelerated lifetime can be improved.

DETAILED DESCRIPTION OF THE INVENTION

Hereinafter, the present invention will be described based on the embodiment shown in the figures.

Multilayer Ceramic Capacitor 1

Figure 1:
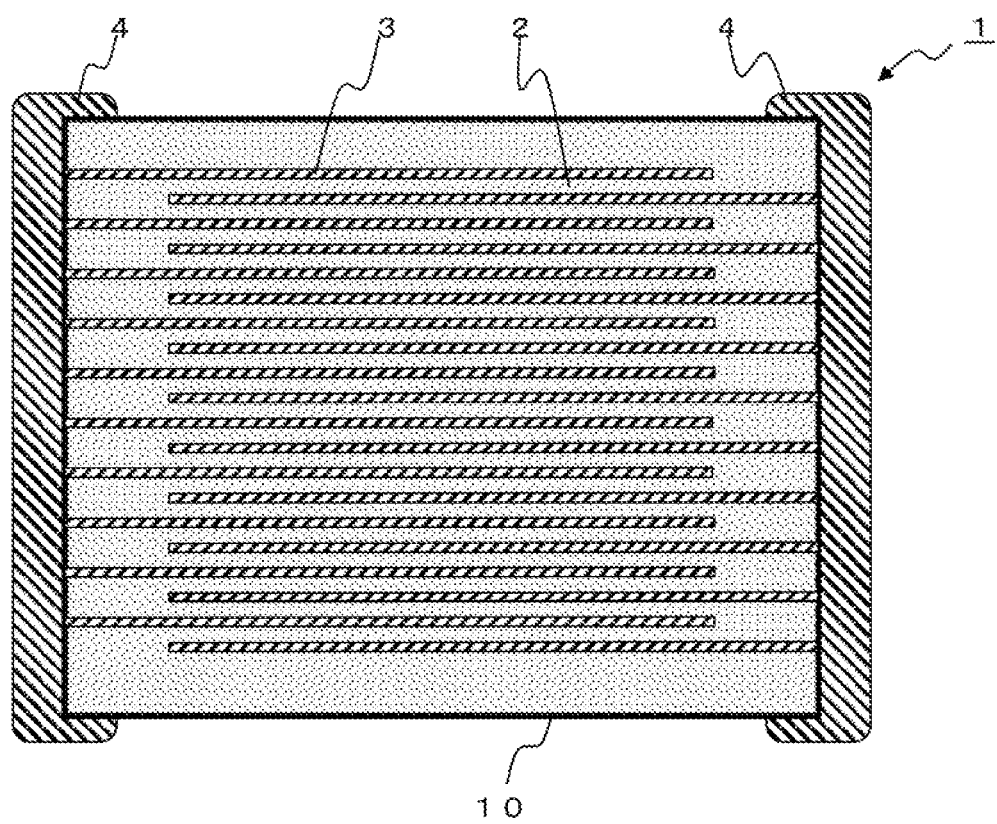
FIG. 1 is a cross section of a multilayer ceramic capacitor according to the first embodiment of the present invention.

As shown in FIG. 1, a multilayer ceramic capacitor 1 as a non-limiting example of a ceramic electronic component has a capacitor element main body 10 in which a dielectric layer 2 and an internal electrode layer 3 are stacked in alternating manner. The internal electrode layer 3 is stacked so that each end face is alternatingly exposed to the surface of the two end parts of the capacitor element main body 10 opposing with each other. A pair of the external electrodes 4 are formed at both end parts of the capacitor element main body 10, and are connected to the exposed end face of the internal electrode layer 3 placed alternatingly, thereby the capacitor circuit is formed.

The shape of the capacitor element body 10 is not particularly limited, and as shown in FIG. 1, usually it is rectangular parallelepiped shape. Also, the size thereof is not particularly limited, and the size may be determined appropriately depending on the purpose of use.

Dielectric Layer 2

A thickness of the dielectric layer 2 is not particularly limited, and it is preferably 0.5 to 20 μm or so per one layer.

A number of the dielectric layer 2 being stacked is not particularly limited, and preferably it is 20 or more, more preferably 50 or more, and particularly preferably 100 or more. The maximum number of stacking is not particularly limited, and for example it is 2000 or so.

The dielectric layer 2 is constituted from the dielectric ceramic composition according to the present embodiment. The dielectric ceramic composition includes barium titanate based composite oxide of perovskite type ($ABO_3$ type) as a main component, the first sub component which will be described in below, and other sub components if needed. Hereinafter, the present embodiment will be described.

(Dielectric Ceramic Composition)

The main component of the dielectric ceramic composition according to the present embodiment is a perovskite type compound which is expressed by a compositional formula of $(Ba_{1-x-y}Sr_xCa_y)_m(Ti_{1-z}Zr_z)O_3$. Here, m, x, y, and z all show molar ratios.

In the compositional formula, m shows A/B ratio, and it is $0.9 \leq m \leq 1.1$, and preferably $0.95 \leq m \leq 1.0$. Also, in other preferable embodiment, m may be $0.9 \leq m \leq 0.95$, and also it may be $1.0 \leq m \leq 1.1$. When the value m of the main component is too small, IR property becomes low due to over sintering (abnormal crystal growth), and when the value m is too large, then the high temperature accelerated lifetime may decline.

In the compositional formula, x shows a ratio of Sr in A site, and it is $0 \leq x \leq 0.5$, preferably $0 \leq x \leq 0.2$, more preferably $0 \leq x \leq 0.1$, further preferably $0 \leq x \leq 0.03$, and it may be 0.

In the compositional formula, y shows a ratio of Ca in A site, and it is $0 \leq y \leq 0.3$, preferably $0 \leq y \leq 0.2$, more preferably $0 \leq y \leq 0.1$, further preferably $0 \leq y \leq 0.01$, and it may be 0.

Also, (x+y) is $0 \leq (x+y) \leq 0.6$, preferably $0 \leq (x+y) \leq 0.4$, more preferably $0 \leq (x+y) \leq 0.2$, further preferably $0 \leq (x+y) \leq 0.03$, and it may be 0.

In the compositional formula, z shows a ratio of Zr in B site, and it is preferably $0.03 \leq z \leq 0.3$, and preferably $0.1 \leq z \leq 0.18$. Also, in other preferable embodiment, z may be $0.03 \leq z \leq 0.1$, and it may be $0.18 \leq z \leq 0.3$. By substituting Zr for B site, the bandgap becomes higher, and the resistance can be increased. On the other hand, when Zr is too much, the rare earth element which is the first sub component is interfered from solid dissolving to the main component, and tends to decrease the high temperature accelerated lifetime.

The dielectric ceramic composition has oxides of the rare earth element R as the first sub component. Here, the rare earth element is at least one selected from the group consisting of Sc, Y, La, Ce, Pr, Nd, Pm, Sm, Eu, Gd, Tb, Dy, Ho, Er, Tm, Yb, and Lu. Preferably, it is at least one selected from the group consisting of Eu, Gd, and Tb. Note that, two or more of the oxides of the rare earth element can be used together.

The oxides of the rare earth element R is used in the ratio of 3 to 30 mol, preferably 10 to 22 mol, and more preferably 15 to 18 mol with respect to 100 mol of the main component. Also, as other preferable embodiment, it may be 3 to 15 mol, and it may be 18 to 30 mol as well. Note that, the oxides of the rare earth element is usually shown as $R_2O_3$, but the ratio in terms of oxides in the present embodiment is shown as the mol number based on $RO_{3/2}$. Although it is not to be theoretically limited in any way, part of the rare earth element R substitutes for A site, and act as donor which releases electron. The released electron captures oxygen defect, thus the movement of the oxygen defect during the high temperature accelerated lifetime test is suppressed, and it is thought to enhance the high temperature accelerated lifetime. When the content of the first sub component is too little, the movement of the oxygen defect cannot be suppressed, thus the high temperature accelerated lifetime may decrease. When the first sub component is too much, the IR property may decrease.

The dielectric ceramic composition of the present invention may include other sub components other than mentioned in above. As the preferable sub components, oxides of Mg as a second sub component, oxides of at least one element M selected from the group consisting of Mn, Cr, Co, and Fe as a third sub component, and a sintering aid may be mentioned.

The second sub component is preferably used in a ratio of 0 to 15 mol, preferably 3 to 10 mol, and further preferably 4.5 to 8 mol in terms of oxides (MgO) with respect to 100 mol of said main component. Also, in other preferable embodiment, it may be 3 to 4.5 mol, and 8 to 10 mol as well. By having the content of the second sub component within the above mentioned range, IR property and the high temperature accelerated lifetime tend to improve in good balance.

The dielectric ceramic composition may include the oxides of at least one element M selected from the group consisting of Mn, Cr, Co, and Fe as the third sub component. Preferably, it includes MnO, CrO, and particularly preferably it includes MnO. Note that, two or more of oxides of Mn, Cr, Co, and Fe may be used together. The ratio of the third sub component is 0 to 5.0 mol, preferably 0.6 to 2.0 mol, and more preferably 1.1 to 1.5 mol in terms of the oxides (MO) with respect to 100 mol of the main component. Also, in other preferable embodiment, it may be 0.6 to 1.1 mol, and it may also be 1.5 to 2.0 mol. When the content of the third sub component is within the above mentioned range, IR property tends to improve. Note that, the ratio of the third sub component in terms of the oxides shows the mol number based on MnO, CrO, CoO, and FeO.

Although it is not to be theoretically limited in any way, part of the metal elements included in the second and third sub components serve as the acceptor which substitutes for B site and receives electron, and it is thought to contribute to the improvement of IR property.

The dielectric ceramic composition can further include the sintering aid. The sintering aid is not particularly limited as long as it contributes to sintering of the above mentioned main component and the first sub component, and usually oxides of Si, Li, Al, Ge, and B are preferably used. In case of using the sintering aid, the amount of the sintering aid used are preferably 0.3 mol or more, more preferably 1.5 to 4.0 mol or more, and particularly preferably 2.0 to 3.3 mol in terms of $SiO_2$, $LiO_{1/2}$, $AlO_{3/2}$, $GeO_2$, or $BO_{3/2}$ with respect to 100 mol of the main component. By having the content of the sintering aid within this range, the insulation resistance and the high temperature accelerated lifetime tend to improve. When the content of the sintering aid is too much, the high temperature accelerated lifetime tends to deteriorate. On the other hand, when too little, the sintering property tends to decline.

As the sintering aid, oxides of Si are preferably used, because it has great effect to improve the properties among the above mentioned oxides. As the oxides including Si, it is not particularly limited, and it may be in a form of $SiO_2$ alone, or it may be in a form of composite oxides between Si and other elements such as alkali metal and alkaline earth metal. In the present embodiment, $SiO_2$ is preferable as the oxides including Si.

By setting the composition of the main component, and the contents of sub components and sintering aid within the above mentioned range, the dielectric ceramic composition having particularly good IR property and high temperature accelerated lifetime can be easily obtained. Particularly, by setting the composition of the main component and the content of the sub components within the specific range, the basic properties such as the specific permittivity and the like can be maintained good and moreover IR property and the high temperature accelerated lifetime can be easily improved.

The dielectric ceramic composition according to the present embodiment may further include other components depending of the desired property. The composition of the dielectric ceramic composition can be verified by a fluorescent X-ray analysis.

(Structure of Dielectric Ceramic Composition)

In the present embodiment, the dielectric ceramic composition constituting the above mentioned dielectric layer 2 includes the dielectric particles and the particle boundary, and includes segregation phase. The above mentioned dielectric ceramic composition includes the complete solid solution particle in which the rare earth element R is uniformly dispersed, and the rare earth element R and Zr are solid dissolved to the entire dielectric particle in a predetermined ratio. The particle shape and particle size of the dielectric particle are not particularly limited.

The complete solid solution particle has a form in which the rare ear element R is diffused and solid dissolved in the main component, and also the rare earth element and Zr are dispersed in predetermined ratio. Thus, the complete solid solution particle does not include phase only made of the main component (usually called as "core"), and it is formed only from phase (diffusion phase) in which the rare earth element R is diffused to the main component. Therefore, the form is different from that of so-called "core-shell particle". Note that, sub component elements other than the rare earth element R may solid dissolved into the main component.

Figure 2:
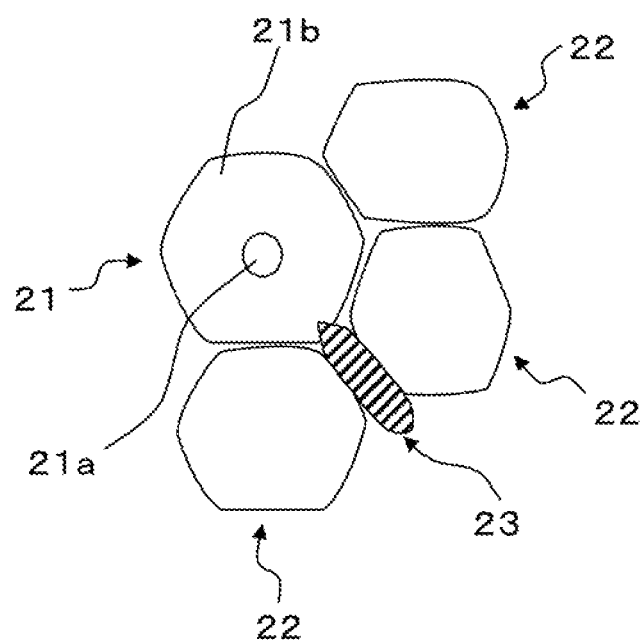
FIG. 2 is an enlarged cross section of an essential part of a dielectric layer 2 shown in FIG. 1.

As schematically shown in FIG. 2, at the cross section of the dielectric particle having the core-shell structure, the phase substantially consisted only from the main component (the main component phase) can be verified as a core 21a at the center part of the particle. Also, the phase where the rare earth element R is solid dissolved (diffused) to the main component (diffusion phase) can be verified around the core as a shell 21b. In other words, when the main component phase exists, the diffusion phase including the main component and the rare earth element R is formed around the main component phase. That is, the dielectric particle having the core-shell structure is the crystal particle (core-shell structure particle 21) having the core-shell structure constituted from the core 21a substantially made of the main component and the shell 21b present around the core 21a in which the rare earth element R is diffused to the main component. The core 21a is substantially formed only from the main component, and the shell 21b is formed from the solid dissolved phase in which the rare earth element R is diffused to the main component. When the diffusion of the rare earth element R into the main component proceeds, the core phase (main component phase) made only from the main component disappears, and forms the dielectric particle (the complete solid solution particle 22) entirely formed only from the diffusion phase (shell).

Also, a segregation phase 23 has a composition which is out of the above mentioned range, and it is phase including excessive alkaline earth metal, for example includes excessive amount of Ti, Zr, rare earth element, or alkaline earth metal.

The dielectric particle of the present embodiment does not have the main component phase (core), and it is the complete solid solution particle 22 which is formed only from the diffusion phase (shell). Note that, in the dielectric layer 2, all of the dielectric particles do not necessarily have to be complete solid solution particles, and the core-shell particle and the segregation phase may be included.

In the present embodiment, when the total number of the complete solid solution particles, core-shell particles, and segregation phase is 100%, the dielectric layer 2 is preferably formed substantially only from the complete solid solution particles, and the ratio of the complete solid solution particle in the dielectric layer 2 is preferably 90% or more, and more preferably 95% or more.

The complete solid solution particle has the rare earth element R as the first sub component solid dissolved to $BaTiO_3$ based main component, and has substantially uniform rare earth element composition. For $BaTiO_3$ based dielectrics, the rare earth element is not necessarily easy to solid dissolve uniformly, in many cases, it is difficult to diffuse all of the rare earth elements used as the raw material into the main component phase, and the segregation phase having excessive rare earth elements is formed. Therefore, in order to introduce the rare earth element into the main component, high temperature firing is necessary, but in case of carrying out high temperature firing, necking tends to easily form, and a function as the dielectrics may decrease.

Therefore, in order to improve the dielectric property, it is necessary to diffuse the rare earth element R into the main component phase. By diffusing the rare earth element R uniformly into the main component phase, the complete solid solution particle having the rare earth element uniformly diffused can be obtained, and the basic properties such as a specific permittivity and the like can be maintained good, and furthermore IR property and high temperature accelerated lifetime can be improved. Also, the segregation phase is also suppressed from forming; hence the dielectric layer having uniform quality can be obtained.

The complete solid solution particle of the present embodiment has the rare earth element which is substantially uniformly distributed in $BaTiO_3$ based main component and Zr substitutes for Ti site, and has a ratio of the rare earth element/Zr within a predetermined range. In $BaTiO_3$ based dielectrics, it is thought that Ti site is substituted with Zr, but it is not necessarily easy to substitute Ti site with Zr, and in many cases, it is difficult to substitute all of Zr used as the raw material for Ti site, and the segregation phase having excessive Zr is formed. Therefore, in order to introduce Zr into the main component, it is necessary to carry out high temperature firing, but in case of high temperature firing, necking tends to easily form, and a function as the dielectrics may decrease.

Therefore, in order to improve the dielectric property, Ti site needs to be substituted with Zr. By ensuring the substitution of Zr for Ti site, the complete solid solution particle in which Zr is uniformly dispersed can be obtained, the basic properties such as a specific permittivity and the like can be maintained good and furthermore IR property and the high temperature accelerated lifetime can be improved. Further, since the segregation phase is suppressed from forming, the dielectric layer having uniform quality can be obtained. Also, as the complete solid solution particle has the ratio of the rare earth element/Zr within predetermined range, IR property and the high temperature accelerated lifetime can be further improved.

In the present embodiment, an uniformity of the rare earth element R and Zr composition is defined as following.

First, the concentration (atom %) of the rare earth element R in the dielectric ceramic composition is defined as Ra when the concentration of Ti atom in the dielectric ceramic composition is deemed to be 100 atom %. That is, Ra is an index of the rare earth element concentration in the entire dielectric ceramic composition.

Also, the average concentration Zr in the complete solid solution particle is defined as Zb and the average concentration of the rare earth element R in the complete solid solution particle is defined as Rb when the concentration of Ti atom is deemed to be 100 atom % in the complete solid solution particle. When the segregation phase having excessive rare earth element is formed, the rare earth element concentration (Rb) in the complete solid solution particle is lower than the rare earth element concentration (Ra) in the entire composition. Also, when an element diffusion is not uniform and insufficient in the complete solid solution particle, the ratio between the rare earth element concentration (Rb) and Zr concentration (Zb) in the complete solid solution particle may become too large or too small.

In the present embodiment, Rb/Ra satisfies 0.82<(Rb/Ra), and preferably satisfies 0.88<(Rb/Ra). This means that the rare earth element concentration in the complete solid solution particle and the rare earth element concentration in the entire composition are close with each other, and also means that the rare earth element is dispersed highly uniformly in the entire dielectric ceramic composition. Also, in other embodiment, it may be 0.82<(Rb/Ra)<0.88.

Further, for the dielectric ceramic composition according to the present embodiment, the rare earth element concentration (Rb) and Zr concentration (Zb) in the complete solid solution particle satisfies 0.6<(Rb/Zb)<1.0, and preferably satisfies 0.7<(Rb/Zb)<1.0. Also, in other embodiment, it may be 0.6<(Rb/Zb)<0.7.

When Rb/Zb is within the above mentioned range, this means that the rare earth element concentration (Rb) and Zr concentration (Zb) in the complete solid solution particle are relatively close with each other and is within certain range. As mentioned in above, by substituting B site (Ti site) with Zr, the bandgap becomes higher and the resistance can be increased. Also, part of the rare earth element R substitutes for A site, and it is thought to serve as a donor which releases electron. The released electron captures oxygen defect, and suppresses the movement of oxygen defect, and contributes to the improvement of the high temperature accelerated lifetime.

As mentioned in above, in the complete solid solution particle which is a main constitution element of the dielectric ceramic composition, the rare earth element concentration (Rb) and Zr concentration (Zb) are balanced, thereby the IR property and the high temperature accelerated lifetime can be further improved.

As such, the dielectric ceramic composition of the present invention has the rare earth element R which is uniformly dispersed in the entire composition, and the ratio between the rare earth element R and Zr composition (Rb/Zb) is within a specific range in the complete solid solution particle which is the main constituting element of the composition.

Also, the rare earth element concentration (Ra) in the dielectric ceramic composition is preferably 3.5 to 20 atom %, and further preferably 10 to 17 atom %. Also, the average concentration (Rb) of the rare earth element in the complete solid solution particle is preferably 2.5 to 17.5 atom %, and further preferably 10 to 16 atom %. The average concentration (Zb) of Zr in the complete solid solution particle is preferably 4 to 27 atom %, and further preferably 11 to 22 atom %. This means that the rare earth element is substantially uniformly dispersed in the composition, the segregation phase having excessive rare earth element is formed only little, and the rare earth element composition in the dielectric ceramic composition and the rare earth element composition in the complete solid solution particle are close with each other. It also means that in the complete solid solution particle, the rare earth element concentration (Rb) and Zr concentration (Zb) are balanced in certain range.

The rare earth element concentration (Ra) in the dielectric ceramic composition when the concentration of Ti atom in the dielectric ceramic composition is deemed to be 100 atom % can be obtained by a fluorescent X-ray analysis. The contents of Ti and the rare earth element in the dielectric ceramic composition are measured, and the concentration of the rare earth element (atom %) when the concentration of Ti atom is deemed to be 100 atom % is defined as Ra.

The average concentration (Rb) of the rare earth element and the average concentration (Zb) of Zr in the complete solid solution particle when the concentration of Ti atom in the complete solid solution particle is deemed to be 100 atom % can be measured by carrying out the point analysis of the rare earth element and Zr using Energy Ray Dispersive X-ray Spectrometer (EDS) attached to Scanning Trasmission Electron Microscope (STEM) to the cross section of the dielectric layer 2. This point analysis is preferably carried out by selecting arbitrary 10 or more points taking 100 nm between each measuring points for each measuring particle, and it is preferably carried out to 10 or more dielectric particles. The composition of Ti is measured simultaneously with the above, and the average of the measured rare earth element composition and Zr composition of each analysis point when the concertation of the Ti atom is deemed to be 100 atom % is calculated to obtain the average concentration (Rb) of the rare earth element and the average concentration (Zb) of Zr.

Figure 3:
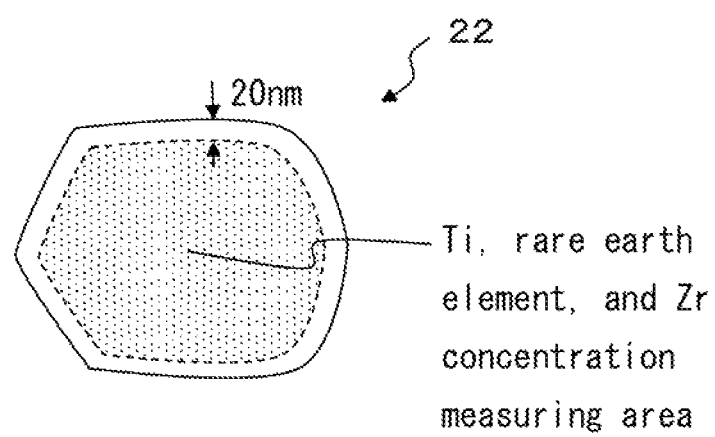
FIG. 3 is a schematic diagram showing measurement points of the concentration (Rb) of the rare earth element R and Zr concentration (Zb) in a complete solid solution particle.

As shown in FIG. 3, the complete solid solution particle 22 is formed only by the diffusion phase, and the compositions thereof (the rare earth element composition and Zr composition) are substantially uniform. In the present embodiment, the measuring point is selected from the area excluding the area 20 nm or less from the particle boundary of the particle.

Figure 4:
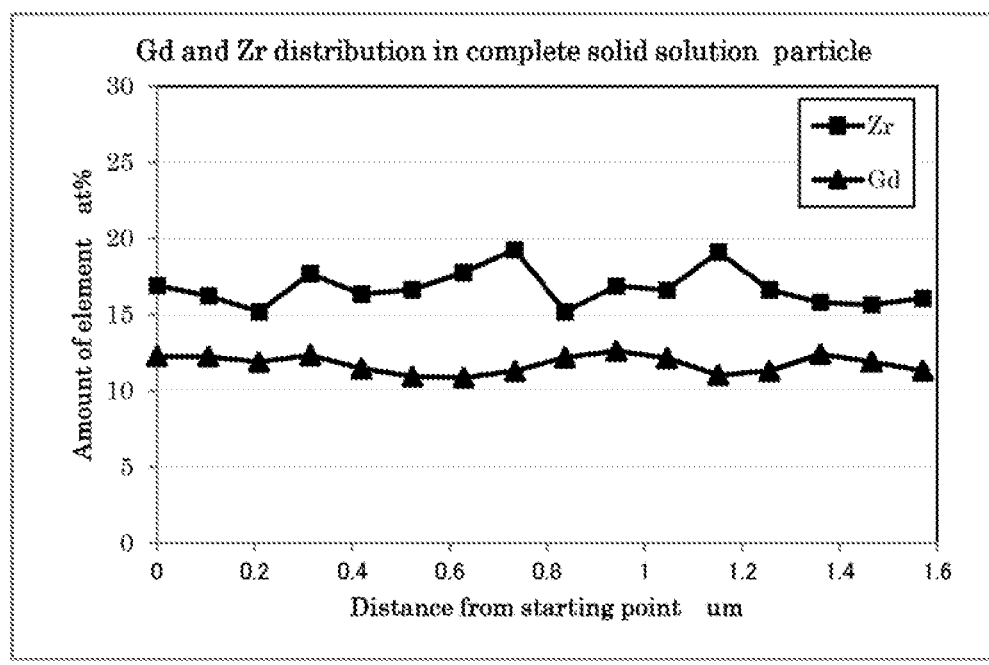
FIG. 4 is an example of a point analysis of the rare earth element composition and Zr composition in the complete solid solution particle.

FIG. 4 shows an example of point analysis of the rare earth element (Gd) composition and Zr composition. FIG. 4 shows the result of analysis of the rare earth element composition and Zr composition in which a starting point is selected from the area excluding 20 nm or less from the particle boundary of the complete solid solution particle and analyzing every 100 nm along a long diameter of the particle. As shown in FIG. 4, in the complete solid solution particle of the present embodiment, the rare earth element composition and Zr composition are substantially uniform in the entire area.

By constituting the dielectric layer with the dielectric ceramic composition including the complete solid solution particle having balanced rare earth element composition and Zr composition, and also having uniform rare earth element concentration, the multilayer ceramic capacitor having excellent lifetime property of the insulation resistance can be obtained even under a high electric field intensity.

In the present embodiment, the average particle size (circle equivalent diameter) of the dielectric particle is preferably 0.6 to 2.0 µm, and more preferably 0.8 to 1.5 µm.

Internal Electrode Layer 3

The conductive material included in the internal electrode layer 3 is not particularly limited, and because the material constituting the dielectric layer 2 is reduction resistant, a relatively inexpensive base metal can be used. As the base metal used as the conductive material, Ni or Ni alloy is preferable. As Ni alloy, the alloy made from Ni and one or more elements selected from the group consisting of Mn, Cr, Co, and Al is preferable, and preferably the content of Ni in the alloy is 95 mass % or more. Note that, in Ni or Ni alloy, various trace components such P and the like may be included by 0.1 mass % or less. The thickness of the internal electrode layer 3 may be determined accordingly based on the purpose of use, and usually it is preferably 0.1 to 3 µm or so.

External Electrode 4

The conductive material included in the external electrode 4 is not particularly limited, and inexpensive Ni, Cu, and the alloy thereof can be used in the present invention. The thickness of the external electrode 4 can be determined appropriately depending on the purpose of use, and usually it is preferably 10 to 50 µm or so.

Method of Producing Multilayer Ceramic Capacitor 1

The multilayer ceramic capacitor 1 of the present embodiment is produced as similar to the conventional multilayer ceramic capacitor, that is the green chip is produced by a printing method or a sheet method using a paste, and firing is carried out, followed by printing or transferring of the external electrode then firing, thereby the multilayer ceramic capacitor 1 of the present embodiment is produced. Hereinafter, the non-limiting example of the production method will be explained.

First, a dielectric material for forming the dielectric layer is prepared, then this is made into a paste, thereby a dielectric layer paste is prepared.

(Materials)

As the dielectric material, the material of the main component and the material of each sub components are prepared. As the materials thereof, oxides of the above mentioned component, a mixture thereof, and composite oxides can be used. Also, various compounds which form the above mentioned oxides and composite oxides by firing, such as carbonate, oxalate, nitrate, hydroxides, organometal compound, and the like can be selected accordingly and mixed for use.

As the material of the main component, those made by various methods such as a so called solid phase method and various liquid phase methods (for example, an oxalate method, a hydrothermal synthesis method, an alkoxide method, a sol gel method, and the like) can be used.

Further, in case components other than the above mentioned main component and sub components are included in the dielectric layer, as the material of such components, as similar to the above, oxides of these components, mixture thereof, and composite oxides can be used. Also, in addition, various compounds which become the above mentioned oxides and the composite oxides by firing can be used as well. The content of each compound in the dielectric material may be determined so that it satisfies the composition of the above mentioned dielectric ceramic composition after firing.

(Preparation of Dielectric Raw Material)

In order to obtain the dielectric ceramic composition according to the present embodiment, preferably each raw material mentioned in above is mixed at once and calcined.

In order to prepare the dielectric raw material, the raw material of each component is thoroughly mixed to obtain mixed powder, then this is heat treated (calcined), and a calcined raw material is obtained. The mixing of the raw material is not particularly limited, and it is thoroughly mixed for 20 hours or so by a wet method, then dried.

A calcining condition is not particularly limited, and a calcining temperature is 900 to 1350° C., preferably 1000 to 1350° C., a temperature holding time is preferably 1 to 10 hours, a temperature increasing rate up to the calcining temperature is 10° C./hour to 2000° C./hour or so, a temperature decreasing rate after the holding time at the calcining temperature is 200° C./hour or more, preferably 300° C./hour or more, and more preferably 400° C./hour or more.

In order to obtain the complete solid solution particle, the holding time is set relatively long such as 4 hours or longer, and the holding temperature is set higher such as 1100° C. or higher, thereby the diffusion of the rare earth element R, Zr, and the like are facilitated hence the complete solid solution particle can be easily obtained.

Also, by increasing the temperature at a slow temperature increasing rate (for example, 10° C./hour or less, preferably 5° C./hour or less, and more preferably 2° C./hour or less) between 100° C. to 200° C. before reaching the holding temperature and up until reaching the holding temperature (a temperature range between the holding temperature and the temperature lower by 100° C. to 200° C. than the holding temperature), the rare earth element R and Zr can be uniformly diffused. For example, when the holding temperature is 1100° C., the temperature is increased at a relatively fast temperature increasing rate (for example, 200° C./hour) from the room temperature to 1000° C., then increasing the temperature at the temperature increasing rate of 10° C./hour or less, preferably 5° C./hour or less, and more preferably 2° C./hour or less between 1000° C. and 1100° C.; thereby the rare earth element and Zr diffuse uniformly, and the complete solid solution particle having uniform rare earth element composition and balanced rare earth element composition and Zr composition can be easily obtained. Although it is not to be limited theoretically in anyway, by slowing the temperature increasing rate before reaching the holding temperature, the rare earth element and Zr tend to be easily incorporated into the main component which is forming at the time, hence the rare earth element and Zr uniformly diffuse in the main component, thus it is thought that the complete solid solution particle having uniform Zr composition can be obtained.

If needed, the calcined raw material obtained as such (the raw material after the reaction) is pulverized. Then, if needed, the calcined raw material, the additional main component raw material and the additional sub component raw material are mixed; thereby the dielectric raw material can be obtained. Note that, part of the components evaporates during the calcination, and the composition may change, thus the addition of the components to the calcined raw material may be determined so that it forms the desired composition after firing.

(Preparation of Green Chip)

Next, the dielectric raw material is made into paste, and then the dielectric paste is prepared. The dielectric layer paste may be an organic paste kneaded with the dielectric material and the organic vehicle, or it may be a water-based paste.

The organic vehicle is obtained by dissolving a binder in an organic solvent. The binder used in the organic vehicle is not particularly limited, and may be properly selected from variety of usual binders such as ethylcellulose, polyvinyl butyral, and the like. Also, the used organic solvent is not particularly limited, and may be appropriately selected from variety of organic solvents such as terpineol, butyl carbitol, acetone, toluene, and the like in accordance with a method used such as a printing method, a sheet method, and the like.

Also, when using a water-based dielectric layer paste, dielectric materials can be kneaded with a water-based vehicle obtained by dissolving an aqueous binder, a dispersant, and the like in water. The aqueous binder used for a water-based vehicle is not particularly limited, and for example, polyvinyl alcohol, cellulose, aqueous acrylic resin, and the like may be used.

An internal electrode layer paste is obtained by kneading conductive materials made of the above mentioned various conductive metals and alloys; or various oxides, organometallic compound, resinate, and the like which become the above mentioned conductive materials after firing with the above mentioned organic vehicle. Also, an inhibitor may be included in the internal electrode layer paste. As the inhibitor, it is not particularly limited, and preferably the inhibitor has the same composition as the main component.

An external electrode paste may be obtained as same as the above mentioned internal electrode layer paste.

The content of organic vehicle in each of the above mentioned pastes is not particularly limited, and may be a usual content, for example, the binder is 1 to 5 mass % or so and the solvent is 10 to 50 mass % or so. Also, in each paste, if needed the additives may be included which are selected from variety of dispersants, plasticizers, dielectrics, insulators, and the like. The total contents of these are preferably 10 mass % or less.

When using the printing method, the dielectric layer paste and the internal electrode layer paste are printed on a substrate such as PET and the like to form layers, and after cutting into a predetermined shape, the green chip is obtained by removing from the substrate.

Also, when using the sheet method, a green sheet is formed by using the dielectric layer paste, and the internal electrode layer paste is printed thereon, then these are stacked and cut into a predetermined shape to form the green chip.

(Binder Removal, Firing, Annealing)

Before firing, the green chip is subjected to a binder removal treatment. The binder removal conditions are a temperature increasing rate of preferably 5 to 300° C./hour, a holding temperature of preferably 180 to 900° C., and a temperature holding time of preferably 0.5 to 24 hours. Also, the binder removal atmosphere is air or reduced atmosphere.

After carrying out binder removal, the green chip is fired. The atmosphere when firing the green chip can be suitably determined depending on the type of the conductive material in the internal electrode layer paste, and when using base metals such as Ni or Ni alloy and the like as the conductive material, the oxygen partial pressure of the firing atmosphere is preferably $10^{-15}$ to $10^{-10}$ MPa. When the oxygen partial pressure is below said range, the conductive material of the internal electrode layer may have abnormal sintering which may result in a breakage of the internal electrode layer. Also, when the oxygen partial pressure exceeds said range, the internal electrode layer tends to oxidize. Also, by firing under low oxygen partial pressure atmosphere, uniform diffusion of the rare earth element and Zr are promoted.

The holding temperature at firing is preferably 1000 to 1400° C., and more preferably 1100 to 1360° C. When the holding temperature is below said range, densification becomes insufficient; and when it exceeds said range, the electrode tends to break due to abnormal sintering of the internal electrode layer, the capacitance-temperature property tends to deteriorate due to the diffusion of the material constituting the internal electrode layer, or the dielectric ceramic composition tends to be reduced.

Further, the temperature increasing rate is preferably 50° C./hour or less, more preferably 20° C./hour or less, and particularly preferably 3 to 15° C./hour; the temperature holding time is preferably 0.5 to 8 hours and more preferably 1 to 3 hours; and the temperature decreasing rate is preferably 50 to 2000° C./hour, and more preferably 200 to 300° C./hour. Also, the firing atmosphere is preferably reduced atmosphere. As for the atmospheric gas, for example, wet mixed gas of $N_2$ and $H_2$ can be used. The oxygen partial pressure in the firing atmosphere is further preferably $10^{-15}$ to $10^{-13}$ MPa.

Although it is not to be limited in anyway, by slowing the temperature increasing rate during firing and by carrying out firing under strongly reduced atmosphere, the substitution of Ti site with Zr is facilitated, the rare earth element uniformly diffuses in the main component, and it is thought that the complete solid solution particle having uniform rare earth element composition and balanced rare earth element composition and Zr composition can be obtained.

After firing in a reduced atmosphere, it is preferable to anneal the capacitor element body. Annealing is a treatment for reoxidizing the dielectric layer, and thereby the lifetime can be significantly longer, thus the reliability improves.

The oxygen partial pressure in the annealing atmosphere is preferably $10^{-9}$ to $10^{-5}$ MPa. When the oxygen partial pressure is below the above range, it may be difficult to reoxidize the dielectric layer. When it exceeds the above range, the internal electrode layer tends to be further oxidized.

The holding temperature at annealing is preferably 1100° C. or less, particularly preferably 500 to 1100° C. When the holding temperature is below the above range, the dielectric layer may not be sufficiently oxidized, which tends to result in a low insulation resistance and a short high temperature accelerated lifetime. On the other hand, when the holding temperature exceeds the above range, not only the internal electrode layer is oxidized and the capacitance decreases, but also the internal electrode layer reacts with the dielectric element itself, which tends to easily cause deteriorated capacitance-temperature property, lowered insulation resistance, and lowered high temperature accelerated lifetime. Note that, the annealing may be constituted by a temperature increasing step and temperature decreasing step. That is, the temperature holding time may be zero. In this case, the holding temperature is same as the maximum temperature.

Additional annealing conditions include: the temperature holding time of preferably 0 to 20 hours, more preferably 2 to 10 hours; and the temperature decreasing rate of preferably 50 to 500° C./hour, more preferably 100 to 300°

C./hour. Also, for example, the atmospheric gas at annealing is preferably $N_2$ or $N_2+H_2O$ gas and the like.

Also, the binder removal treatment, firing, and annealing may be performed continuously or independently.

The capacitor element body obtained as such is then carried out with an end surface polishing, for example, by a barrel polishing or a sand blasting, and the external electrode layer paste is pasted thereon, and then fired, thereby the external electrode 4 is formed. If needed, a covering layer may be formed on the surface of the external electrode 4 by plating or so.

The multilayer ceramic capacitor of the present embodiment produced as such is mounted on the printed-circuit board or so by soldering and the like to be used in variety of electronic devices and the like.

Hereinabove, an embodiment of the present invention is described, but the present invention is not to be limited to the above-mentioned embodiments and can be variously modified within the scope of the present invention.

For example, in the above-mentioned embodiment, a multilayer ceramic capacitor is exemplified as an electronic component according to the present invention. However, the electronic component according to the present invention is not limited to the multilayer ceramic capacitor and may be any having the dielectric layer having the above constitution.

As discussed in above, the electronic component according to the present invention has excellent IR property and a high temperature accelerated lifetime, thus it is particularly suited as the multilayer ceramic capacitor for the mid-high voltage having high rated voltage (for example 100 V or higher).

EXAMPLE

Hereinafter, the present invention will be described based on the further detailed examples, but the present invention is not limited to the examples.

(Sample Numbers 1 to 28)
(Material)

As the main component material, barium carbonate ($BaCO_3$), calcium carbonate ($CaCO_3$), strontium carbonate ($SrCO_3$), titanium oxide ($TiO_2$), and zirconium oxide ($ZrO_2$) were prepared. Further, oxides of the rare earth element as the first sub component material, magnesium oxide (MgO) as the second sub component, oxide of Mn as the material of the third sub component, and oxide of Si as the material of a sintering aid were prepared.

The main component material and the first sub component material were weighed so that the main component composition and the rare earth element concentration after firing satisfied the composition shown in Table 1. Also, 6.0 mol of magnesium oxide (MgO) as the second sub component material, 1.3 mol of oxide of Mn as the third sub component material, and 3.0 mol of oxide of Si as the material of the sintering aid were weighed with respect to 100 mol of the main component, and then these were mixed. The mixing was carried out for 20 hours by a ball mill using wet mix stirring. The compound obtained after the wet mix stirring was dehydrated and dried.

(Calcination)

After being dehydrated and dried, the temperature was raised from room temperature to 1000° C. at the temperature increasing rate of 200° C./hour, and the temperature was increased at the rate shown in Table 2 from 1000° C. to 1100° C. to calcine for 4 hours at 1100° C., and then pulverized if necessary. Thereby, powder of the calcined materials (dielectric materials) was obtained.

(Preparation of Dielectric Layer Paste)

Next, the obtained dielectric material: 100 parts by mass, polyvinyl butyral resin: 10 parts by mass, dioctyl phthalate (DOP) as a plasticizer: 5 parts by mass, and alcohol as a solvent: 100 parts by mass were mixed by a ball mill to form paste; thereby a dielectric layer paste was obtained.

(Preparation of Internal Electrode Layer Paste)

Also, aside from the above, Ni particles: 44.6 parts by mass, terpineol: 52 parts by mass, ethyl cellulose: 3 parts by mass, and benzotriazole: 0.4 parts by mass were kneaded by triple rolls to form paste, thereby an internal electrode layer paste was obtained.

(Preparation of Green Chip)

Then, using the above obtained dielectric layer paste, on a PET film, a green sheet was formed so that the thickness after drying was 15 μm. Next, using the internal electrode layer paste, an electrode layer was printed in a predetermined pattern thereon, followed by removing the sheet from the PET film, thereby the green sheet with the electrode layer was obtained. Then, a plurality of green sheets with the electrode layer were stacked and adhered by pressure to obtain a green multilayer body. The green multilayer body was cut into a predetermined size to obtain a green chip.

(Preparation of Multilayer Ceramic Capacitor)

Then, the obtained green chip was subjected to binder removal treatment, firing, and annealing under the following conditions, thereby a multilayer ceramic sintered body was obtained.

The binder removal treatment was performed under the condition of the temperature increasing rate: 25° C./hour, the holding temperature: 260° C., the temperature holding time: 8 hours, and the atmosphere: air.

The firing condition was performed under the temperature rising rate and the oxygen partial pressure as shown in Table 2, the holding temperature: 1200° C., and the temperature holding time of 2 hours. The temperature decreasing rate was 200° C./hour. Note that, the atmospheric gas was wet mixed gas of $N_2+H_2$.

Annealing was performed at the temperature increasing rate: 200° C./hour, the holding temperature: 1050° C., the temperature holding time: 2 hours, the temperature decreasing rate: 200° C./hour, and the atmospheric gas: wet gas of $N_2$ (the oxygen partial pressure: $10^{-7}$ MPa).

Note that, a wetter was used to wet the atmospheric gas during firing and annealing.

Next, after polishing end faces of the obtained sintered body with sandblast, In—Ga alloy was coated as an external electrode to obtain a sample of the multilayer ceramic capacitor shown in FIG. 1. The size of the obtained capacitor sample was 3.2 mm×1.6 mm×0.6 mm, the thickness of the dielectric layer was 10 μm, the thickness of the internal electrode layer was 1.0 μm, and the number of the dielectric layers sandwiched by the internal electrode layers was 5.

The obtained capacitor samples were subjected to the measurements of the rare earth element concentration (Ra) in the dielectric ceramic composition, the average concentration of the rare earth element (Rb) and Zr (Zb) in the complete solid solution particle, and the insulation resistance (IR), and the high temperature accelerated lifetime (MTTF) of the multilayer ceramic capacitor in accordance with the method shown in below.

Rare Earth Element Concentration (Ra) in Dielectric Ceramic Composition

Using a fluorescent X-ray analysis, the content of Ti and the rare earth element in the dielectric ceramic composition were measured, and when the concentration of Ti atom was deemed to be 100 atom %, Ra represented the concentration of the rare earth element (atom %).

Average Concentration of Rare Earth Element (Rb) and Zr Concentration (Zb) in Complete Solid Solution Particle Using Energy Ray Dispersive X-ray Spectrometer (EDS) attached to Scanning Trasmission Electron Microscope (STEM), the point analysis of Ti, the rare earth element, and Zr was carried out. This point analysis was carried out by selecting arbitrary 10 or more points taking 100 nm apart with one another for each measuring particle, and it was preferably carried out to 10 or more dielectric particles. When the concentration of Ti atom was deemed to be 100 atom %, Rb represented the average of the measured rare earth element concentration of each analysis point. Also, Zb represented the average of the measured Zr concentration.

The measurement point was selected from the area excluding 20 nm or less from the particle boundary of the complete solid solution particle.

Insulation Resistance (IR)

Using an insulation resistance meter (R8340A by Advantest) to a capacitor sample, an insulation resistance IR of a capacitor sample which was applied with DC voltage of 500 V at 20° C. for 10 seconds then leaving for 50 second after the voltage application was measured. In the present example, $3.0\times10^{12}$ Ω or more was defined good (A), $3.6\times10^{12}$ Ω or more was defined excellent (S), and less than $3.0\times10^{12}$ Ω was defined poor (F).

High Temperature Accelerated Lifetime (MTTF)

The capacitor sample was applied with DC voltage under the electric field of 60 V/μm at 200° C., then by measuring an insulation deterioration time of the capacitor sample, the high temperature accelerated lifetime was evaluated. In the present example, the lifetime was defined as the time which took for the insulation resistance to drop by one digit from the start of the voltage application. Also, in the present example, the above mentioned evaluation was carried out to 10 capacitor samples, then Mean Time To Failure was calculated by carrying out Weibull analysis, then this Mean Time To Failure was defined as the high temperature accelerated lifetime of the sample. In the present example, 100 hours or longer was defined good (A), 150 hours or longer was defined as excellent (S), and less than 100 hours was defined failure (F).

Results of the above are shown in following Tables. In Table 1, the sample shown with * indicates that it was out of the range of claim 1. The contents of the rare earth element and Zr are shown by atom % in terms of predetermined atom, when the concentration of Ti in the dielectric ceramic composition was deemed to be 100 atom %. For example, in case of Gadolinium oxide $Gd_2O_3$, atom % of Gb atom is shown. Also, in case of using plurality of rare earth elements, the total amount thereof is shown.

TABLE 1

| Sample No. | $(Ba_{1-x-y}Sr_xCa_y)_m(Ti_{1-x}Zr_x)O_3$ | | | | Type of rare earth element | Rare earth element concentration in composition [at %] Ra | Average concentration of rare earth element in complete solid solution particle [at %] Rb | Average concentration of Zr in complete solid solution particle [at %] Zb | Rb/Ra | Rb/Zb | IR [Ω] 500 V, 1 min | Evaluation | High temperature accelerated lifetime (MTTF) [h] 200° C. 60 V/μm | Evaluation |
|---|---|---|---|---|---|---|---|---|---|---|---|---|---|---|
| | m | x | y | z | | | | | | | | | | |
| *1 | 0.895 | 0 | 0.01 | 0.22 | Tb | 14.5 | 12.1 | 18.5 | 0.83 | 0.65 | 8.8E+09 | F | unable to measure | F |
| 2 | 0.900 | 0.01 | 0 | 0.23 | Tb | 16.2 | 13.5 | 20.8 | 0.83 | 0.65 | 3.2E+12 | A | 123 | A |
| 3 | 1.100 | 0.02 | 0 | 0.23 | Eu | 15.1 | 13.2 | 21.0 | 0.87 | 0.63 | 3.3E+12 | A | 101.1 | A |
| *4 | 1.105 | 0 | 0.03 | 0.24 | Gd | 13.6 | 11.5 | 18.5 | 0.85 | 0.62 | 3.1E+12 | A | 54.0 | F |
| *5 | 0.990 | 0 | 0.01 | 0.02 | Eu | 3.0 | 2.5 | 3.9 | 0.83 | 0.64 | 4.3E+11 | F | 162.1 | S |
| 6 | 1.000 | 0 | 0 | 0.03 | Gd | 3.5 | 2.9 | 4.5 | 0.83 | 0.64 | 3.1E+12 | A | 132.7 | A |
| 7 | 1.050 | 0.03 | 0 | 0.30 | Tb | 19.0 | 16.3 | 26.1 | 0.86 | 0.62 | 3.1E+12 | A | 121.1 | A |
| *8 | 0.980 | 0 | 0.01 | 0.31 | Gd | 19.0 | 17.0 | 25.9 | 0.89 | 0.66 | 3.8E+12 | S | 55.5 | F |
| 9 | 1.000 | 0.01 | 0.01 | 0.06 | Gd | 4.0 | 3.5 | 5.2 | 0.88 | 0.67 | 3.5E+12 | A | 101.4 | A |
| 10 | 0.985 | 0 | 0 | 0.28 | Dy | 20.0 | 17.2 | 25.5 | 0.86 | 0.67 | 3.0E+12 | A | 143.2 | A |
| *12 | 0.960 | 0 | 0 | 0.22 | Ho | 15.0 | 12.3 | 18.0 | 0.82 | 0.68 | 3.2E+12 | A | 87.4 | F |
| 13 | 0.970 | 0 | 0 | 0.22 | Ho | 16.2 | 13.5 | 19.8 | 0.83 | 0.68 | 3.1E+12 | A | 102.1 | A |
| 14 | 0.970 | 0.03 | 0 | 0.20 | Ho | 13.9 | 12.1 | 18.5 | 0.87 | 0.65 | 3.1E+12 | A | 135.2 | A |
| 15 | 1.000 | 0 | 0 | 0.19 | Tb | 13.1 | 12.1 | 17.5 | 0.92 | 0.69 | 3.3E+12 | A | 149.8 | A |
| *16 | 0.990 | 0 | 0.02 | 0.29 | Gd | 18.0 | 15.0 | 27.0 | 0.83 | 0.56 | 3.2E+12 | A | 52.0 | F |
| *17 | 0.980 | 0.01 | 0.02 | 0.29 | Ho | 18.2 | 15.2 | 26.5 | 0.84 | 0.57 | 3.3E+12 | A | 57.3 | F |
| *18 | 0.980 | 0 | 0 | 0.22 | Gd | 16.0 | 13.2 | 22.5 | 0.83 | 0.59 | 3.5E+12 | A | 63.3 | F |
| 19 | 0.970 | 0.01 | 0 | 0.21 | Tb, Eu | 15.4 | 13.0 | 21.4 | 0.84 | 0.61 | 3.5E+12 | A | 100.4 | A |
| 20 | 0.980 | 0 | 0.02 | 0.21 | Gd | 15.5 | 13.2 | 20.2 | 0.85 | 0.65 | 3.4E+12 | A | 122.8 | A |
| 21 | 0.970 | 0.02 | 0 | 0.22 | Gd | 14.0 | 11.6 | 17.2 | 0.83 | 0.67 | 3.3E+12 | A | 125.4 | A |
| 22 | 0.980 | 0 | 0 | 0.25 | Ho | 16.8 | 15.5 | 21.8 | 0.92 | 0.71 | 3.3E+12 | A | 150.2 | S |
| 23 | 0.990 | 0.01 | 0 | 0.19 | Tb | 16.0 | 14.2 | 14.3 | 0.89 | 0.99 | 3.0E+12 | A | 170.8 | S |

TABLE 1-continued

| Sample No. | $(Ba_{1-x-y}Sr_xCa_y)_m(Ti_{1-z}Zr_z)O_3$ | | | | Type of rare earth element | Rare earth element concentration in composition [at %] Ra | Average concentration of rare earth element in complete solid solution particle [at %] Rb | Average concentration of Zr in complete solid solution particle [at %] Zb | Rb/Ra | Rb/Zb | IR [Ω] 500 V, 1 min Evaluation | High temperature accelerated lifetime (MTTF) [h] 200° C. 60 V/um Evaluation |
|---|---|---|---|---|---|---|---|---|---|---|---|---|
| | m | x | y | z | | | | | | | | |
| ※ 24 | 0.970 | 0.02 | 0 | 0.19 | Gd | 17.0 | 16.0 | 15.8 | 0.94 | 1.01 | 2.7E+12   F | 173.0   S |
| 25 | 0.990 | 0.1 | 0.3 | 0.21 | Tb | 13.0 | 11.3 | 16.6 | 0.87 | 0.68 | 3.3E+12   A | 127.7   A |
| 26 | 0.970 | 0.5 | 0.1 | 0.22 | Dy | 15.9 | 14.0 | 21.0 | 0.88 | 0.67 | 3.4E+12   A | 134.2   A |
| 27 | 1.000 | 0.3 | 0.2 | 0.21 | Y  | 14.0 | 11.9 | 17.8 | 0.85 | 0.67 | 3.3E+12   A | 130.4   A |
| 28 | 0.970 | 0.1 | 0.1 | 0.22 | Ho | 15.9 | 14.0 | 20.4 | 0.88 | 0.69 | 3.4E+12   A | 122.9   A |

Note:
Ra, Rb and Zb are ratios with respect to 100 atom % of Ti atom.

TABLE 2

| | Calcination condition | Firing condition | |
|---|---|---|---|
| Sample No. | Temperature increasing rate [° C./hr] | Temperature increasing rate [° C./hr] | Oxygen partial pressure [MPa] |
| 1-11, 25-26 | 10 | 5 | 1.0E−14 |
| ※ 12 | 200 | 10 | 1.1E−13 |
| 13 | 20 | 10 | 1.1E−13 |
| 14 | 10 | 10 | 1.1E−13 |
| 15 | 5 | 10 | 1.1E−13 |
| ※ 16 | 10 | 200 | 1.1E−13 |
| ※ 17 | 5 | 200 | 1.1E−13 |
| ※ 18 | 5 | 100 | 1.1E−13 |
| 19 | 5 | 20 | 1.1E−13 |
| 20 | 5 | 10 | 1.1E−13 |
| 21 | 5 | 5 | 1.1E−13 |
| 22 | 5 | 5 | 4.3E−14 |
| 23 | 5 | 5 | 3.0E−15 |
| ※ 24 | 5 | 5 | 6.0E−15 |

In FIG. 4, the result of the rare earth element (Gd) composition and Zr composition analysis of the dielectric ceramic composition of sample 21 is shown in which the starting point was selected from the area excluding 20 nm or less from the particle boundary of the complete solid solution particle and was carried every 100 nm along the straight line of the long diameter direction. As shown in FIG. 4, the complete solid solution particle of the present embodiment had uniform rare earth element composition and Zr composition across the entire area.

Figure 5:
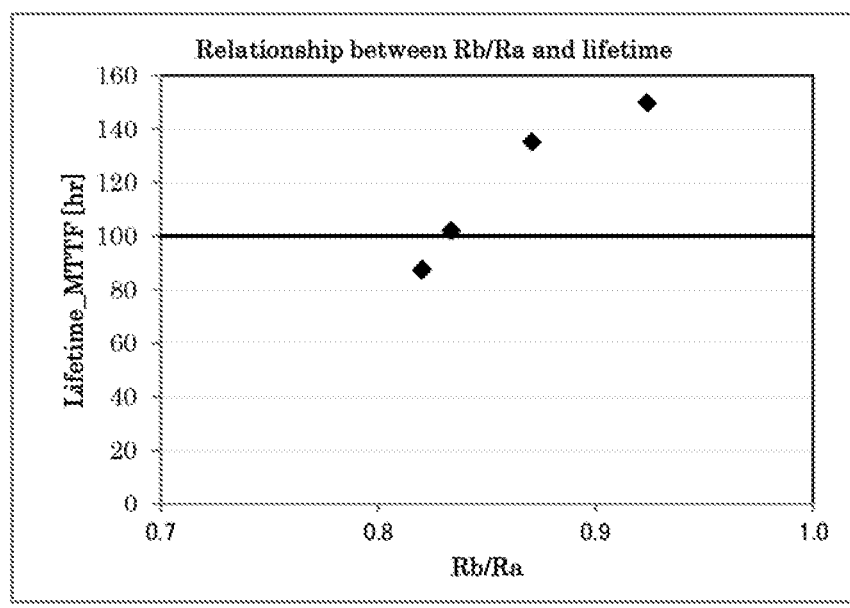
FIG. 5 shows a relationship between Rb/Ra and high temperature accelerated lifetime (MTTF) of Sample numbers 12 to 15.
Figure 6:
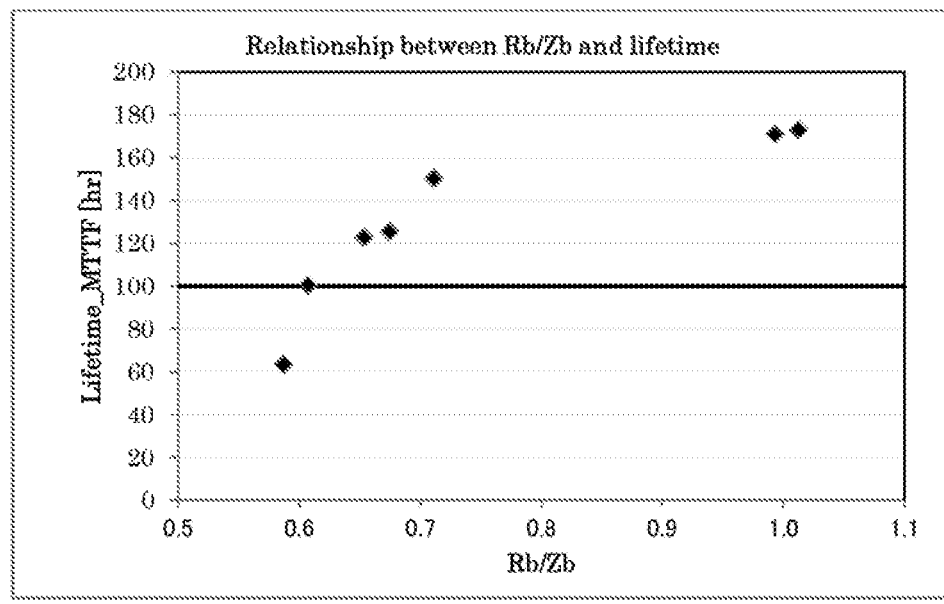
FIG. 6 shows a relationship between Rb/Zb and high temperature accelerated lifetime (MTTF) of Sample numbers 18 to 24.
Figure 7:
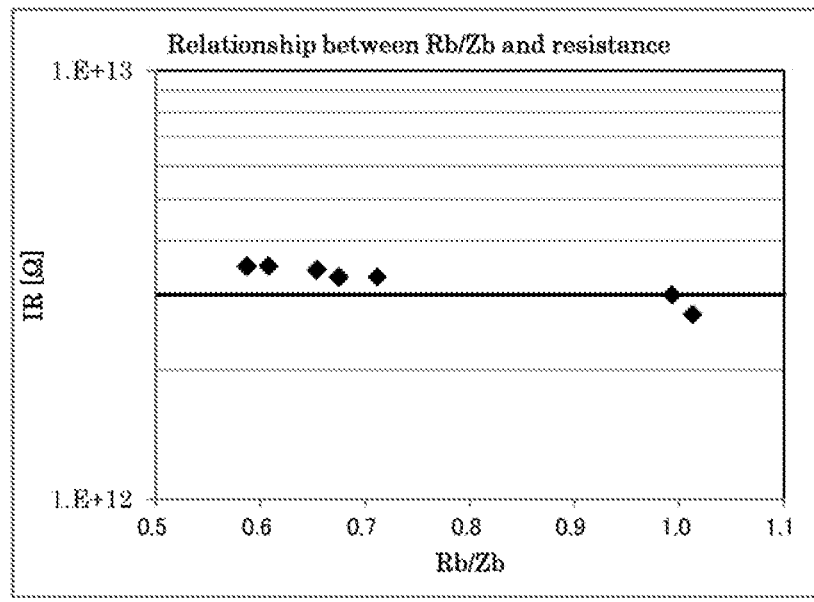
FIG. 7 shows a relationship between Rb/Zb and an insulation resistance (IR) of Sample numbers 18 to 24.

FIG. 5 shows a relationship of Rb/Ra and the high temperature accelerated lifetime (MTTF) of Sample numbers 12 to 15. According to FIG. 5, it is apparent that when Rb/Ra exceeded 0.82, the high temperature accelerated lifetime significantly improved. FIG. 6 shows a relationship of Rb/Zb and the high temperature accelerated lifetime (MTTF) of Sample numbers 18 to 24. FIG. 7 shows a relationship of Rb/Zb and the insulation resistance (IR) of Sample numbers 18 to 24. According to FIG. 6 and FIG. 7, it is apparent that when Rb/Zb satisfied 0.6<(Rb/Zb)<1.0, the high temperature accelerated lifetime (MTTF) and IR were in good balance.

DESCRIPTION OF THE REFERENCE NUMERAL

1 . . . Multilayer ceramic capacitor
2 . . . Dielectric layer
21 . . . Core-shell structure particle
22 . . . Complete solid solution particle
3 . . . Internal electrode layer
4 . . . External electrode
10 . . . Capacitor element main body

What is claimed is:

1. A dielectric ceramic composition comprising
   a main component made of a perovskite type compound expressed by a compositional formula of $(Ba_{1-x-y}Sr_xCa_y)_m(Ti_{1-z}Zr_z)O_3$ (note that, m, x, y, and z of the above compositional formula all represent molar ratios, and each satisfies $0.9 \leq m \leq 1.1$, $0 \leq x \leq 0.5$, $0 \leq y \leq 0.3$, $0 \leq (x+y) \leq 0.6$, and $0.03 \leq z \leq 0.3$), and
   a first sub component made of an oxide of a rare earth element R (note that, R is at least one selected from the group consisting of Sc, Y, La, Ce, Pr, Nd, Pm, Sm, Eu, Gd, Tb, Dy, Ho, Er, Tm, Yb, and Lu), wherein
   the dielectric ceramic composition includes dielectric particles and a particle boundary, and the dielectric particles include a complete solid solution particle in which Zr and the rare earth element are solid dissolved to the entire dielectric particle,
   when Ra represents a concentration of the rare earth element R in the dielectric ceramic composition in case a concentration of Ti atom in the dielectric ceramic composition is deemed to be 100 atom %, and when Zb represents the average concentration of Zr and Rb represents an average concentration of the rare earth element in the complete solid solution particle in case the concentration of ti atom in the complete solid solution particle is deemed to be 100 atom %,
   $0.82 < (Rb/Ra)$, and
   $0.6 < (Rb/Zb) < 1.0$ are satisfied.

2. The dielectric ceramic composition according to claim 1, wherein the (Rb/Zb) satisfies $0.7 < (Rb/Zb) < 1.0$.

3. An electronic component including the dielectric ceramic composition according to claim 1.

4. An electronic component including the dielectric ceramic composition according to claim 2.

5. A multilayer ceramic capacitor comprising a dielectric layer including the dielectric ceramic capacitor composition according to claim 1 and an internal electrode layer.

6. A multilayer ceramic capacitor comprising a dielectric layer including the dielectric ceramic capacitor composition according to claim 2 and an internal electrode layer.

* * * * *